United States Patent
Hyakutake et al.

(10) Patent No.: US 7,128,971 B2
(45) Date of Patent: Oct. 31, 2006

(54) COATED GLASS FIBERS FOR REINFORCING RUBBER

(75) Inventors: Hiroyuki Hyakutake, Mie (JP); Toshiya Monden, Mie (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 10/761,418

(22) Filed: Jan. 22, 2004

(65) Prior Publication Data

US 2004/0219359 A1    Nov. 4, 2004

(30) Foreign Application Priority Data

Jan. 22, 2003  (JP)  ............................. 2003-013108
Dec. 4, 2003   (JP)  ............................. 2003-406069

(51) Int. Cl.
*B32B 17/02*   (2006.01)
*B05D 1/38*    (2006.01)

(52) U.S. Cl. ...................... 428/392; 428/375; 428/390; 427/389.7; 427/704.2; 524/424

(58) Field of Classification Search ................ 428/375, 428/391, 392, 378, 390; 524/424; 427/389.7, 427/704.2

See application file for complete search history.

(56) References Cited

U.S. PATENT DOCUMENTS

| 4,604,437 A | 8/1986 | Renner |
| 5,663,257 A | 9/1997 | Futaesaku et al. |

FOREIGN PATENT DOCUMENTS

| EP | 0937740 A1 | 8/1999 |
| JP | 63126975 A | 5/1988 |
| JP | 11241275 A | 9/1999 |

*Primary Examiner*—Jill Gray
(74) *Attorney, Agent, or Firm*—Crowell & Moring LLP

(57) ABSTRACT

A coated glass fiber for reinforcing a rubber includes a glass fiber, a first coating layer covering the glass fiber, and a second coating layer covering the first coating layer. The first coating layer is prepared by a process including (a) dispersing a resorcinol-formaldehyde resin and a rubber latex in water to prepare a first coating solution; (b) applying the first coating solution to the glass fiber to form a first precursory layer; and (c) drying the first precursory layer into the first coating layer. The second coating layer is prepared by a second process including (d) dispersing bis-allylnadiimide, a rubber elastomer, a vulcanizing agent, and an inorganic filler in an organic solvent to prepare a second coating solution; (e) applying the second coating solution to the first coating layer to form a second precursory layer; and (f) drying the second precursory layer into the second coating layer.

13 Claims, 1 Drawing Sheet

COATED GLASS FIBERS FOR REINFORCING RUBBER

BACKGROUND OF THE INVENTION

The present invention relates to rubber-reinforcing coated glass fibers, which have been subjected to a surface treatment for improving bonding between the glass fibers and a parent rubber to be reinforced. It relates particularly to rubber-reinforcing coated glass fibers to be embedded in a parent rubber (e.g., hydrogenated nitrile rubber) to improve tensile strength and dimensional stability of the parent rubber for the use as a mechanical belt such as automotive timing belt.

It is generally widely conducted to embed high-strength fibers (e.g., glass fibers, nylon fibers, and polyester fibers) as a reinforcing member in a parent rubber (e.g., mechanical belt and tire) in order to improve strength of the parent rubber. The reinforcing fibers to be embedded in the parent rubber are required to have a good adhesion to the parent rubber to prevent exfoliation at their interface. Glass fibers themselves are inferior in adhesion to rubber and therefore cannot serve as a reinforcing member.

In order to improve adhesion between parent rubber and glass fibers and to prevent exfoliation at their interface, coated glass fibers are embedded in mechanical belt. The coated glass fibers may be prepared by the steps of (a) twining glass filaments into glass fibers (yarns); (b) dispersing a resorcinol-formaldehyde resin and a latex in water to prepare a coating solution; (c) applying the coating solution to the glass fibers to form a precursory layer thereon; and (d) drying the precursory layer into a coating layer, thereby preparing the coated glass fibers. Under a high temperature environment, the coated glass fibers are embedded in a parent rubber, and the fiber-reinforced rubber is formed into a mechanical belt. The above-prepared coated glass fibers are not necessarily sufficient in adhesion strength. For example, automotive timing belt is used under a high temperature environment in an engine compartment. Therefore, a heat resistant rubber (e.g., a hydrogenated nitrile rubber cross-linked using sulfur or peroxide) is used as the parent rubber. When a timing belt containing the above-prepared coated glass fibers is continuously bent under high temperature, there may occur an exfoliation at an interface between the parent rubber and the coated glass fibers in use for a long time.

In order to provide mechanical belts having reliability for a long time under high temperature environment due to good adhesion between hydrogenated nitrile rubber and glass fibers, there are proposals for coating glass fibers with a first coating layer (prepared from the above coating solution in which a resorcinol-formaldehyde resin and a latex are dispersed in water) and a second coating layer of a composition different from that of the first coating layer.

Japanese Patent Laid-open Publication JP-A-63-126975, corresponding to Japanese Patent Examined Publication JP-B-2-4715, discloses a coating solution containing a halogen-containing polymer and an isocyanate for forming the second coating layer on the first coating layer. It is disclosed therein that the coated glass fibers are embedded in a hydrogenated nitrile rubber.

Japanese Patent Laid-open Publication JP-A-11-241275, corresponding to Japanese Patent 3201330, discloses (a) a first coating solution containing a resorcinol-formaldehyde condensate and a rubber latex for forming the first coating layer on glass fibers and (b) a second coating solution containing a rubber-blended material, a vulcanizing agent, and a maleimide-based vulcanization accelerator for forming the second coating layer on the first coating layer. It is disclosed therein that the coated glass fibers are embedded in a mixed rubber of a hydrogenated nitrile rubber and a hydrogenated nitrile rubber in which zinc methacrylate is dispersed.

Conventional rubber-reinforcing glass fibers are, however, still not sufficient in adhesion to heat resistant rubber (e.g., a hydrogenated nitrile rubber cross-linked using sulfur or peroxide). In fact, adhesion strength may become inferior in use for a long time, and exfoliation may occur at their interface. With this, fiber-reinforced rubbers may fail to maintain the original strength and may become inferior in dimensional stability. Thus, there is a demand for improve adhesion strength between glass fibers and heat resistant rubber as the parent rubber.

SUMMARY OF THE INVENTION

It is therefore an object of the present invention to provide a coated glass fiber for reinforcing a rubber so that the reinforced rubber can maintain its original strength and is improved in dimensional stability even if the reinforced rubber is used as a heat resistant belt under a high temperature environment According to the present invention, there is provided a coated glass fiber for reinforcing a rubber. This coated glass fiber includes a glass fiber, a first coating layer covering the glass fiber, and a second coating layer covering the first coating layer. The first coating layer is prepared by a process including (a) dispersing a resorcinol-formaldehyde resin and a rubber latex in water to prepare a first coating solution; (b) applying the first coating solution to the glass fiber to form a first precursory layer; and (c) drying the first precursory layer into the first coating layer. The second coating layer is prepared by a second process including (d) dispersing bis-allylnadiimide, a rubber elastomer, a vulcanizing agent, and an inorganic filler in an organic solvent to prepare a second coating solution; (e) applying the second coating solution to the first coating layer to form a second precursory layer; and (f) drying the second precursory layer into the second coating layer.

DESCRIPTION OF THE PREFERRED EMBODIMENTS

Figure 1:
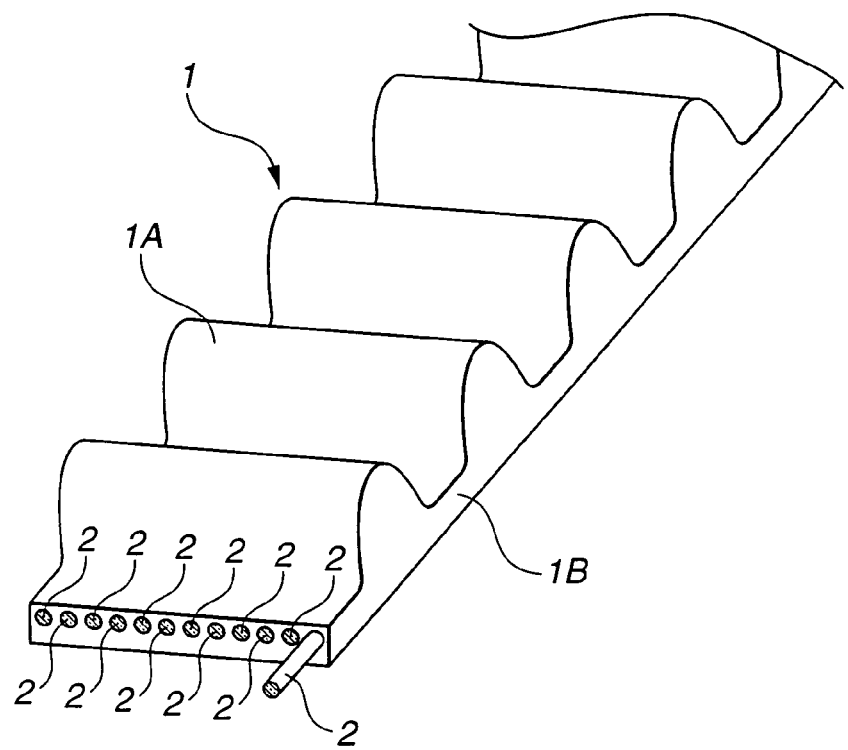
FIG. 1 is a perspective enlarged view of a timing belt, showing a section in which rubber-reinforcing glass fibers are embedded.

A coated glass fiber according to the present invention is superior in adhesion to a heat-resistant parent rubber (e.g., a hydrogenated nitrile rubber cross-linked using sulfur or peroxide), when the coated glass fiber is embedded in the parent rubber. Therefore, it is possible to prevent exfoliation at their interface, even if the fiber-reinforced rubber is used as a heat resistant belt for a long time. Thus, it is possible to preferably use the fiber-reinforced rubber (in which a coated glass fiber according to the present invention is embedded) as a mechanical belt (e.g., automotive timing belt) that requires to have heat resistance.

As stated above, the first coating solution of the present invention is prepared by dispersing a resorcinol-formaldehyde resin and a rubber latex in water. In case that a glass fiber coated with only the first coating layer is embedded in the parent rubber, it is not possible to obtain a sufficient bonding strength at an interface between such glass fiber and the parent rubber. Thus, it is necessary to form a second coating layer of the present invention on the first coating layer.

The rubber latex is used as a component of the first coating solution. It can be a vinylpyridine-styrene-butadiene copolymer for obtaining a superior bonding strength at an interface between the glass fibers and the parent rubber. For example, a vinylpyridine-styrene-butadiene copolymer usable in the present invention may have a composition where vinylpyridine:styrene: butadiene=(10–20 parts by weight):(10–20 parts by weight):(60–80 parts by weight). Examples of vinylpyridine-styrene-butadiene copolymer commercial products having such composition and being usable in the present invention are PYRATEX of NIPPON A&L INC., No. 0650 of JSR Corporation, and NIPOL 1218FS of ZEON CORPORATION.

A part of the vinylpyridine-styrene-butadiene copolymer may be replaced with another rubber elastomer. If this replacement is not conducted at all, the first coating layer may become too high in stickiness. With this, the first coating layer may be transferred (removed) from the glass fibers. Thus, it may become difficult to cleanly conduct the steps, and workability may become inferior. Examples of the another rubber elastomer include carboxyl-group-modified styrene-butadiene rubber (copolymer) and acrylonitrile-butadiene rubber. Of these, styrene-butadiene copolymer can preferably be used since it is compatible with vinylpyridine-styrene-butadiene copolymer. The vinylpyridine-styrene-butadiene copolymer (100 wt %) may be replaced with the another rubber elastomer in an amount of 30–80 wt % so that the coated glass fibers are not impaired in adhesion to rubber and heat resistance. Exemplary commercial products of the styrene-butadiene copolymer include No. 2108 of JSR Corporation and J-9049 of NIPPON A&L INC.

As stated above, the second coating solution is prepared by dispersing bisallylnadiimide, a rubber elastomer, a vulcanizing agent, and an inorganic filler in an organic solvent.

Bisallylnadiimide is a thermosetting imide resin. Bisallylnadiimide of low molecular weight is superior in compatibility with other resins, and cured bisallylnadiimide has a glass transition point of 300° C. or higher.

The inventors unexpectedly found that the use of bisallylnadiimide in the second coating solution brings about an advantageous effect in which the original bonding strength between the coated glass fibers and the parent rubber is maintained for a long time even under high temperature. With this, it is possible to obtain a mechanical belt superior in dimensional stability and heat resistance.

The bisallylnadiimide of the second coating solution may be at least one selected from the group consisting of N-N'-hexamethylenediallylnadiimide, N-N'-(m-xylylene)diallylnadiimide, and N-N'-(4,4'-diphenylmethane)diallylnadiimide. Of these, it is preferable to use N-N'-hexamethylenediallylnadiimide to obtain a suitable bonding strength. Exemplary commercial products of the bisallylnadiimide usable in the invention include BANI-H, BANI-X and BANI-M of MARUZEN PETROCHEMICAL CO., LTD. N-N'-hexamethylenediallylnadiimide, N-N'-(m-xylylene)diallylnadiimide, and N-N'-(4,4'-diphenylmethane)diallylnadiimide are respectively represented by the following three (upper, middle and lower) formulas.

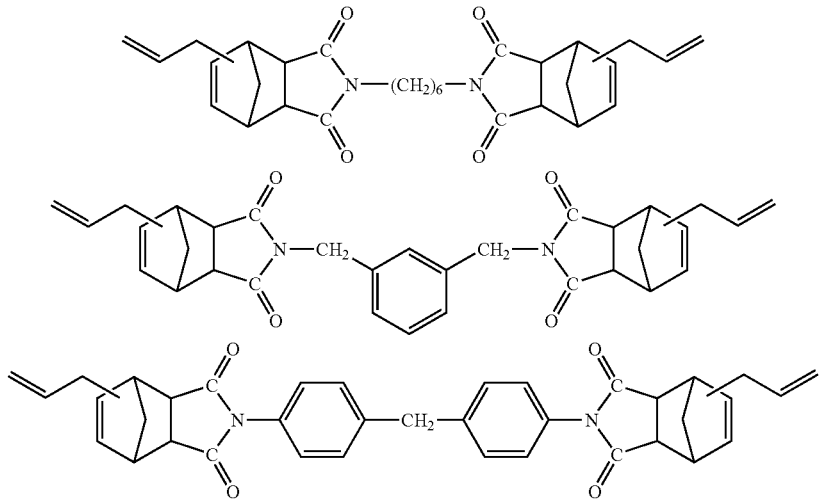

It is preferable that the second coating solution contains, based on the total weight (100 wt %) of the rubber elastomer, 0.3–10.0 wt % of the bisallylnadiimide, 0.5–50.0 wt % of the vulcanizing agent, and 10.0–70.0 wt % of the inorganic filler.

If the amount of the bisallylnadiimide is less than 0.3 wt %, it may be difficult to obtain a sufficient bonding strength between the coated glass fibers and the parent rubber. If the amount of the bisallylnadiimide is greater than 10.0 wt %, the second coating layer may become hard and brittle. With this, the final rubber product may become inferior in flexion fatigue property.

If the amount of the vulcanizing agent is less than 0.5 wt %, it may be difficult to obtain a sufficient bonding strength between the coated glass fibers and the parent rubber. If the amount of the vulcanizing agent is greater than 50.0 wt %, the second coating layer may become hard and brittle. With this, the final rubber product may become inferior in flexion fatigue property.

If the amount of the inorganic filler is less than 10.0 wt %, it may be difficult to obtain a sufficient bonding strength between the coated glass fibers and the parent rubber. If the amount of the inorganic filler is greater than 70.0 wt %, the second coating layer may become hard and brittle. With this, the final rubber product may become inferior in flexion fatigue property.

Examples of the rubber elastomer of the second coating solution include chloroprene rubber, acrylonitrile-butadiene rubber, and styrene-butadiene rubber. It is preferable to use chlorosulfonated polyethylene due to its high heat resistance.

Examples of the inorganic filler of the second coating solution include carbon black and magnesium oxide. Of these, it is preferable to use carbon black, since it contributes to a suitable bonding strength between the coated glass fibers and the parent rubber.

The vulcanizing agent of the second coating solution for curing the second coating layer may be at least one selected from nitroso compounds and zinc compounds. With this, it is possible to further improve bonding strength between the coated glass fibers and the parent rubber. In particular, it is preferable to use at least one nitroso compound such as para-dinitrosobenzene and para-dinitrosobenzene polymer.

Following non-limitative examples are illustrative of the present invention. The second coating layer was prepared by using bisallylnadiimide in Examples 1–5, and in contrast it was prepared by not using bisallylnadiimide in Comparative Examples 1–4.

EXAMPLE 1

A first coating solution of 1,000 parts by weight was prepared by adding water to 447 parts by weight of a vinylpyridine-styrene-butadiene latex (vinylpyridine:styrene:butadiene=15 moles:15 moles:70 moles; solid matter content: 41.0 wt %), 195 parts by weight of a styrene-butadiene latex (solid matter content: 40.0 wt %), 320 parts by weight of an addition condensate (solid matter content: 6.7 wt %) between resorcinol and formaldehyde, and 22 parts by weight of aqueous ammonia (concentration: 25.0 wt %). As the vinylpyridine-styrene-butadiene latex, PYRATEX (trade name) of NIPPON A&L INC. was used. As the styrene-butadiene latex, that of No. 2108 of JSR Corporation was used.

Separately, a second coating solution was prepared by mixing together 100 parts by weight of a chlorosulfonated polyethylene (TS-430 of TOSOH CORPORATION), 40 parts by weight of p-dinitrobenzene (vulcanizing agent), 0.3 parts by weight of N-N'-hexamethylenediallylnadiimide (BANI-H (trade name) of MARUZEN PETROCHEMICAL CO., LTD.), 30 parts by weight of carbon black, and 1315 parts by weight of xylene. In this preparation, N-N'-hexamethylenediallylnadiimide, p-dinitrobenzene and carbon black were respectively in amounts of 0.3 wt %, 40 wt % and 30 wt %, based on the total weight (100 wt %) of the chlorosulfonated polyethylene.

Then, three strands of glass fiber filaments (each strand was formed of 200 glass fiber filaments (diameter: 9 μm)) were aligned with each other. The first coating solution was applied to these three strands of glass fiber filaments, followed by drying, thereby forming a first coating layer thereon. The first coating layer was in an amount of 19 wt %, based on the total weight of the strands of glass fiber filaments.

The three strands of glass fiber filaments (having the first coating layer thereon) were dried at 280° C. for 22 seconds, and then subjected to an initial twist of 2 times per 2.54 cm in one direction to prepare a bundle. In this manner, 13 bundles were prepared in total and then subjected to a final twist of 2 times per 2.54 cm in the counter direction to prepare a cord. The second coating solution was applied to the cord, followed by drying at 110° C. for 1 min, thereby forming a second coating layer on the first coating layer. Thus, one rubber-reinforcing glass fiber cord of S-twist was obtained from the 39 strands of glass fiber filaments (since 3×13=39). Furthermore, rubber-reinforcing glass fiber cords of Z-twist were prepared in the same manner as that of S-twist except that the directions of the initial and final twists of Z-twist were respectively counter to those of S-twist.

The second coating layer was in an amount of 3.5 wt %, based on the total weight (100 wt %) of the glass fiber cord having the first and second coating layers.

A first heat-resistant rubber was prepared by mixing 100 parts by weight of a hydrogenated nitrile rubber (No. 2020 of ZEON CORPORATION) with 40 parts by weight of carbon black, 5 parts by weight of flowers of zinc, 0.5 parts by weight of stearic acid, 0.4 parts by weight of sulfur, 2.5 parts by weight of a vulcanization accelerator, and 1.5 parts by weight of an antioxidant. Separately, a second heat-resistant rubber was prepared by mixing 100 parts by weight of a hydrogenated nitrile rubber (No. 2010 of ZEON CORPORATION) with 40 parts by weight of carbon black, 5 parts by weight of flowers of zinc, 0.5 parts by weight of stearic acid, 5 parts by weight of 1,3-di(t-butylperoxyisopropyl)benzene, and 1.5 parts by weight of an antioxidant.

First and second test pieces for evaluating bonding strength were prepared, as follows. 20 glass fiber cords (prepared as above) were aligned on a sheet (thickness: 3 mm; width: 25 mm) of the first heat-resistant rubber, followed by putting a cloth thereon. Then, a pressure of 196 Newton (N) was added from above under 150° C. in a manner to embed the glass fiber cords (except their end portions) into the first rubber sheet. Under this condition, vulcanization was conducted for 30 min, thereby obtaining the first test piece. The second test piece was prepared in the same manner as that of the first test piece except in that a sheet of the first heat-resistant rubber was replaced with that of the second heat-resistant rubber and that the pressure was added from above under 170° C.

Then, adhesion strength of the glass fiber cords to each test piece was measured as follows. The glass fiber cords and each rubber sheet were respectively clamped at their end portions by first and second clamps. Then, the first and second clamps were moved away from each other at a speed of 50 mm/min to fracture each test piece. The maximum resistance against this movement was recorded as adhesion strength. The results are shown in Table 1.

When the glass fiber cords and the rubber sheet did not exfoliate from each other at their interface in the adhesion strength test, a fractured condition of the test piece was referred to "rubber fracture" (see Table 1). In contrast, when at least a part of them exfoliated at their interface, a fractured condition of the test piece was referred to "interface fracture". A test piece of rubber fracture is superior in adhesion strength than a test piece of interface fracture.

TABLE 1

|  | 1st Heat-resistant Rubber | | 2nd Heat-resistant Rubber | |
| --- | --- | --- | --- | --- |
|  | Adhesion Strength (N) | Fractured Condition | Adhesion Strength (N) | Fractured Condition |
| Ex. 1 | 333 | Rubber Fracture | 363 | Rubber Fracture |
| Ex. 2 | 317 | Rubber Fracture | 333 | Rubber Fracture |
| Ex. 3 | 294 | Rubber Fracture | 323 | Rubber Fracture |
| Ex. 4 | 314 | Rubber Fracture | 343 | Rubber Fracture |
| Ex. 5 | 294 | Rubber Fracture | 294 | Rubber Fracture |
| Com. Ex. 1 | 78 | Interface Fracture | 67 | Interface Fracture |
| Com. Ex. 2 | 98 | Interface Fracture | 118 | Interface Fracture |
| Com. Ex. 3 | 137 | Interface Fracture | 265 | Rubber Fracture |
| Com. Ex. 4 | 274 | Rubber Fracture | 98 | Interface Fracture |

EXAMPLE 2

Example 1 was repeated except in that the amount of N-N'-hexamethylenediallylnadiimide was changed to 2 parts by weight in the preparation of the second coating solution. In other words, N-N'-hexamethylenediallylnadiimide, p-dinitrobenzene and carbon black were respectively in amounts of 2 wt %, 40 wt % and 30 wt %, based on the total weight (100 wt %) of the chlorosulfonated polyethylene.

EXAMPLE 3

Example 1 was repeated except in that the amount of N-N'-hexamethylenediallylnadiimide was changed to 10 parts by weight in the preparation of the second coating solution. In other words, N-N'-hexamethylenediallylnadiimide, p-dinitrobenzene and carbon black were respectively in amounts of 10 wt %, 40 wt % and 30 wt %, based on the total weight (100 wt %) of the chlorosulfonated polyethylene.

EXAMPLE 4

Example 1 was repeated except in that 0.3 parts by weight of N-N'-hexamethylenediallylnadiimide was replaced with 2 parts by weight of N-N'-(4,4'-diphenylmethane)diallylnadiimide in the preparation of the second coating solution. In other words, N-N'-(4,4'-diphenylmethane)diallylnadiimide, p-dinitrobenzene and carbon black were respectively in amounts of 2 wt %, 40 wt % and 30 wt %, based on the total weight (100 wt %) of the chlorosulfonated polyethylene.

EXAMPLE 5

Example 1 was repeated except in that 0.3 parts by weight of N-N'-hexamethylenediallylnadiimide was replaced with 2 parts by weight of N-N'-(m-xylylene)diallylnadiimide in the preparation of the second coating solution. In other words, N-N'-(m-xylylene)diallylnadiimide, p-dinitrobenzene and carbon black were respectively in amounts of 2 wt %, 40 wt % and 30 wt %, based on the total weight (100 wt %) of the chlorosulfonated polyethylene.

COMPARATIVE EXAMPLE 1

Example 1 was repeated except in that the formation of the second coating layer was omitted.

COMPARATIVE EXAMPLE 2

Example 1 was repeated except in that N-N'-hexamethylenediallylnadiimide was omitted in the preparation of the second coating solution.

COMPARATIVE EXAMPLE 3

Example 1 was repeated except in that 0.3 parts by weight of N-N'-hexamethylenediallylnadiimide were replaced with 1 part by weight of N-N'-(m-phenylene)dimaleimide in the preparation of the second coating solution.

COMPARATIVE EXAMPLE 4

Example 1 was repeated except in that the second coating solution was prepared by mixing together 100 parts by weight of a chlorosulfonated polyethylene (TS-430 of TOSOH CORPORATION), 40 parts by weight of 4,4'-diphenylmethanediisocyanate, 30 parts by weight of carbon black, and 1315 parts by weight of xylene.

Running Fatigue Test

First to third timing belts (width: 19 mm; length: 876 mm) were respectively prepared by embedding rubber-reinforcing glass fiber cords of Examples 1 and 2 and Comparative Example 2 in the second heat-resistant rubbers of Example 1 and subjected a running test for evaluating their heat-resistance and flexion-resistance running fatigue property. In this test, the timing belts were run under high temperature while they were flexed by using pulleys, and they were evaluated with tensile strength change before and after this run. Particulars of the test are described in detail, as follows.

FIG. 1 shows one of the first to third timing belts. The timing belt 1 has (a) many projections 1A (height: 3.0 mm) to be drivingly meshed with pulleys and (b) a base portion 1B (thickness: 2.0 mm) having thereon the projections 1A. As shown by the section of FIG. 1, twelve glass fiber cords 2 are embedded in the base portion 1B of the timing belt 1 in a manner to alternately arrange glass fiber cords of S-twist and Z-twist.

Figure 2:
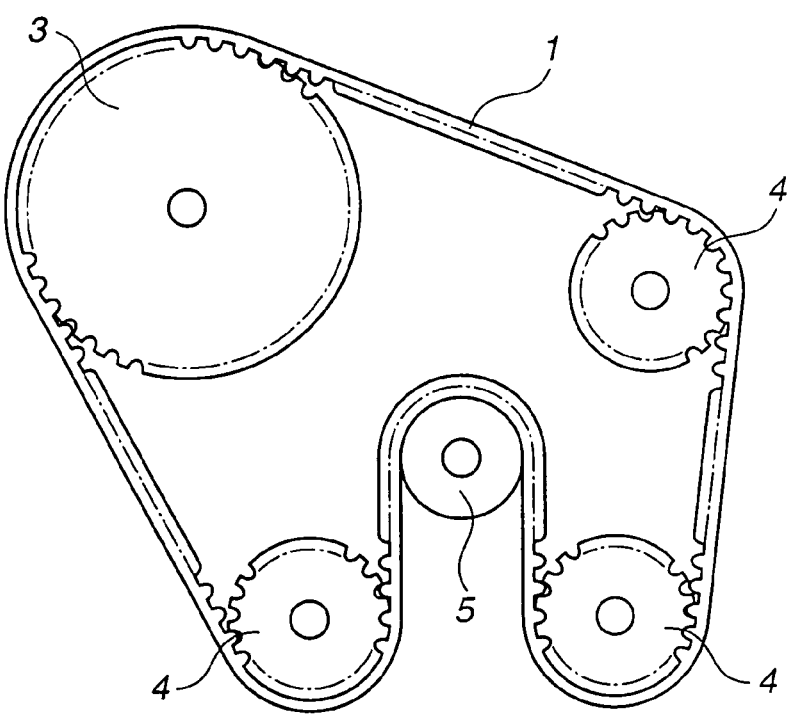
FIG. 2 is a schematic view showing an essential part of a tester for testing timing belts with respect to heat-resistance and flexion-resistance running fatigue property.

FIG. 2 shows an essential part of a tester for conducting the running fatigue test. As shown in FIG. 2, each timing belt 1 was mounted on the tester equipped with a driving motor (not shown in the drawings). The tester has (a) a driving pulley 3 that is driven by the driving motor, (b) three driven pulleys 4 that are driven by running the timing belt 1, and (c) an idler 5 that is smoothly rotatable and movable for providing the timing belt 1 with a suitable tension (500N) in the run. The driving pulley 3 had a diameter of 120 mm and 40 teeth (T). Each driven pulley 4 had a diameter of 60 mm and 20 teeth (T). During the running test, the driving pulley 3 was rotated at a rate of 3,000 rpm, and each driven pulley 4 was rotated at a rate of 6,000 rpm.

As shown in FIG. 2, the running test was conducted for 500 hr under 130° C. by rotating the driving pulley 3 at a rate of 3,000 rpm, while the timing belt 1 was flexed by using driven pulleys 4 and the idler 5. Before and after the running test, tensile strength of the timing belt 1 was measured.

The strength maintenance was determined by the following expression:

Strength Maintenance (%)=(Tensile Strength after Test)÷(Tensile Strength before Test)×100

The results are shown in Table 2.

TABLE 2

| | 1st Timing Belt (Example 1) | 2nd Timing Belt (Example 2) | 3rd Timing Belt (Com. Ex. 2) |
|---|---|---|---|
| Strength Maintenance (%) | 93 | 90 | 82 |

The entire contents of Japanese Patent Application No. 2003-13108 (filed on Jan. 22, 2003) and 2003-406069 (filed on Dec. 4, 2003), of which priorities are claimed in the present application, are incorporated herein by reference.

What is claimed is:

1. A coated glass fiber for reinforcing a rubber, comprising:
    (i) a glass fiber;
    (ii) a first coating layer covering the glass fiber, the first coating layer being prepared by a first process comprising the steps of:
        (a) dispersing a resorcinol-formaldehyde resin and a rubber latex in water to prepare a first coating solution;
        (b) applying the first coating solution to the glass fiber to form a first precursory layer; and
        (c) drying the first precursory layer into the first coating layer; and
    (iii) a second coating layer covering the first coating layer, the second coating layer being prepared by a second process comprising the steps of:
        (d) dispersing bisallylnadiimide, a rubber elastomer, a vulcanizing agent, and an inorganic filler in an organic solvent to prepare a second coating solution;
        (e) applying the second coating solution to the first coating layer to form a second precursory layer; and
        (f) drying the second precursory layer into the second coating layer.

2. A coated glass fiber according to claim 1, wherein the second coating solution of the step (d) comprises, based on a total weight of the rubber elastomer, 0.3–10.0 wt % of the bisallylnadiimide, 0.5–50.0 wt % of the vulcanizing agent, and 10.0–70.0 wt % of the inorganic filler.

3. A coated glass fiber according to claim 1, wherein the bisallylnadiimide of the second coating solution is at least one selected from the group consisting of N-N'-hexamethylenediallylnadiimide, N-N'-(m-xylylene)diallylnadiimide, and N-N'-(4,4'-diphenylmethane)diallylnadiimide.

4. A coated glass fiber according to claim 1, wherein the rubber elastomer of the second coating solution is a chlorosulfonated polyethylene.

5. A coated glass fiber according to claim 1, wherein the inorganic filler of the second coating solution is carbon black.

6. A coated glass fiber according to claim 1, wherein the vulcanizing agent is at least one selected from the group consisting of nitroso compounds and zinc compounds.

7. A coating solution for covering a glass fiber, which is prepared by a process comprising the step of dispersing bisallylnadiimide, a rubber elastomer, a vulcanizing agent, an inorganic filler in an organic solvent.

8. A method for producing a coated glass fiber that reinforces a rubber, the coated glass fiber comprising (i) a glass fiber; (ii) a first coating layer covering the glass fiber; and (iii) a second coating layer covering the first coating layer, the method comprising the steps of:
    (a) dispersing a resorcinol-formaldehyde resin and a rubber latex in water to prepare a first coating solution;
    (b) applying the first coating solution to the glass fiber to form a first precursory layer;
    (c) drying the first precursory layer into the first coating layer;
    (d) dispersing bisallylnadiimide, a rubber elastomer, a vulcanizing agent, and an inorganic filler in an organic solvent to prepare a second coating solution;
    (e) applying the second coating solution to the first coating layer to form a second precursory layer; and
    (f) drying the second precursory layer into the second coating layer.

9. A method according to claim 8, wherein the second coating solution of the step (d) comprises, based on a total weight of the rubber elastomer, 0.3–10.0 wt % of the bisallylnadiimide, 0.5–50.0 wt % of the vulcanizing agent, and 10.0–70.0 wt % of the inorganic filler.

10. A method according to claim 8, wherein the bisallylnadiimide of the second coating solution is at least one selected from the group consisting of N-N'-hexamethylenediallylnadiimide, N-N'-(m-xylylene)diallylnadiimide, and N-N'-(4,4'-diphenylmethane)diallylnadiimide.

11. A method according to claim 8, wherein the rubber elastomer of the second coating solution is a chlorosulfonated polyethylene.

12. A method according to claim 8, wherein the inorganic filler of the second coating solution is carbon black.

13. A method according to claim 8, wherein the vulcanizing agent is at least one selected from the group consisting of nitroso compounds and zinc compounds.

* * * * *